(12) United States Patent
Han et al.

(10) Patent No.: US 10,543,491 B2
(45) Date of Patent: Jan. 28, 2020

(54) MULTI-STAGE SUSPENSION MAGNETIZING ROASTING-MAGNETIC SEPARATION SYSTEM DEVICE AND METHOD FOR REFRACTORY IRON ORE

(71) Applicant: Northeastern University, Shenyang, Liaoning (CN)

(72) Inventors: Yuexin Han, Liaoning (CN); Yanjun Li, Liaoning (CN); Shuai Yuan, Liaoning (CN); Peng Gao, Liaoning (CN); Yongsheng Sun, Liaoning (CN); Wenbo Li, Liaoning (CN)

(73) Assignee: Northeastern University, Shenyang, Liaoning (CN)

( * ) Notice: Subject to any disclaimer, the term of this patent is extended or adjusted under 35 U.S.C. 154(b) by 0 days.

(21) Appl. No.: 15/991,690

(22) Filed: May 29, 2018

(65) Prior Publication Data

US 2018/0361395 A1 Dec. 20, 2018

(30) Foreign Application Priority Data

Mar. 31, 2017 (CN) .......................... 2017 1 0207721

(51) Int. Cl.
*B03C 1/015* (2006.01)
*C22B 1/02* (2006.01)
(Continued)

(52) U.S. Cl.
CPC .............. *B03C 1/015* (2013.01); *B03C 1/30* (2013.01); *C21B 13/006* (2013.01);
(Continued)

(58) Field of Classification Search
CPC ........... B03C 1/015; B03C 1/30; B03C 1/005; B03C 1/02; B03C 1/0335; B03C 2201/18;
(Continued)

(56) References Cited

U.S. PATENT DOCUMENTS 3,684,485 A * 8/1972 Meyer .................. C21B 13/006
75/435
4,930,359 A * 6/1990 Wolfrum .................. B07B 7/06
73/863.23

(Continued)

FOREIGN PATENT DOCUMENTS

| CN | 101122442 A | 2/2008 |
| CN | 101392989 A | 3/2009 |

(Continued)

*Primary Examiner* — David C Mellon
(74) *Attorney, Agent, or Firm* — Novick, Kim & Lee, PLLC; Allen Xue

(57) ABSTRACT

The invention discloses a multi-stage suspension magnetizing roasting-magnetic separation system and method for refractory iron ore, which belongs to the field of mineral processing technology. This system comprises multistage suspension preheater, multistage suspension oxidizer, multistage suspension redactor, on-line grade analyzer, ore-like splitter, magnetic separator, dust remover, roots blower and other components and connection modes. The refractory iron ore treated by the present method can be produced to homogeneous magnetite or maghemite accurately, and through magnetic separation, on-line grade analyzer detection and ore-like splitter, the concentrate powder which reach the set grade can be obtained, and the unqualified ore powder enters the next stage of oxidation-reduction-magnetic separation-split treatment. Through the present system and method, products with different roasting quality can be obtained, and can avoid the phenomenon of over burning or under burning occurring in the past process and equipment.

7 Claims, 1 Drawing Sheet

(51) Int. Cl.
*C21B 13/14* (2006.01)
*F27B 15/02* (2006.01)
*C21B 13/00* (2006.01)
*F27B 1/00* (2006.01)
*C22B 1/00* (2006.01)
*B03C 1/30* (2006.01)

(52) U.S. Cl.
CPC .......... *C21B 13/0073* (2013.01); *C21B 13/14* (2013.01); *C21B 13/146* (2013.01); *C22B 1/00* (2013.01); *C22B 1/02* (2013.01); *F27B 1/005* (2013.01); *F27B 15/02* (2013.01); *B03C 2201/20* (2013.01)

(58) Field of Classification Search
CPC .... B03C 1/20; B03C 1/22; B03C 1/32; B03C 2201/20; B03C 2201/22; C21B 13/146; C21B 13/0073; C21B 13/006; C21B 13/14; C21B 2100/00; C21B 2100/02; C21B 2100/04; C21B 2100/40; C21B 2100/60; C21B 2300/00; C21B 2300/02; C21B 13/0033; C21B 13/004; C21B 13/0086; C22B 1/00; C22B 1/02; C22B 3/20; C22B 3/22; C22B 3/44; C22B 5/12; C22B 5/14; F27B 1/005; F27B 15/02; B04C 7/00; B07B 13/00; B07B 9/00; B07B 9/02
See application file for complete search history.

(56) References Cited

U.S. PATENT DOCUMENTS 7,572,418 B2 * 8/2009 Horta .................. C01G 23/047
423/82
8,114,186 B2 * 2/2012 Ruthner ................ C01G 49/02
419/1

FOREIGN PATENT DOCUMENTS

| CN | 103436691 A | 12/2013 |
| CN | 104726690 A | 6/2015 |
| CN | 104818378 A | 8/2015 |
| CN | 105132670 A | 12/2015 |
| CN | 105316476 A | 2/2016 |
| CN | 105734272 A | 7/2016 |
| CN | 106241826 A | 12/2016 |
| CN | 205907304 U | 1/2017 |

* cited by examiner

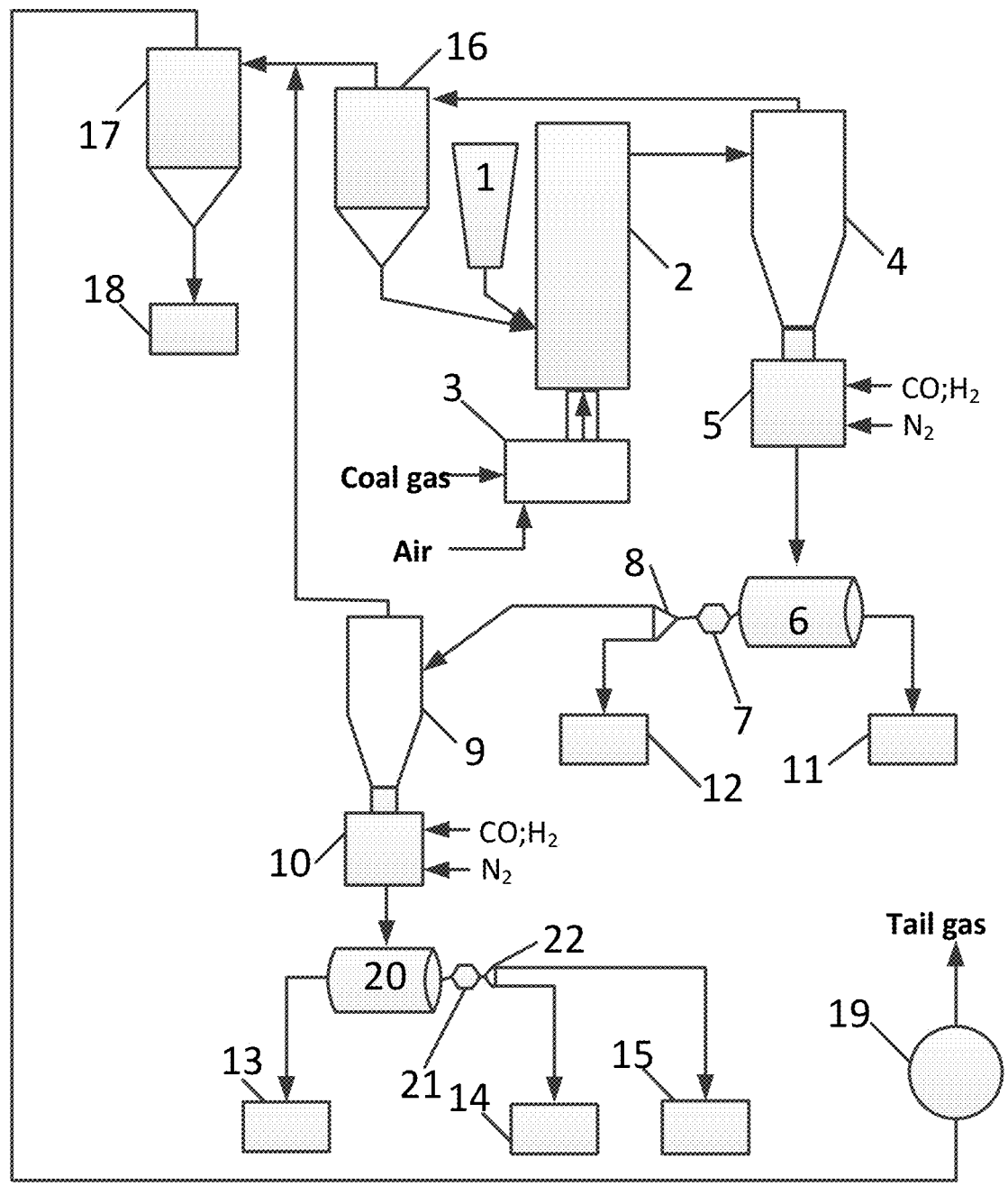

MULTI-STAGE SUSPENSION MAGNETIZING ROASTING-MAGNETIC SEPARATION SYSTEM DEVICE AND METHOD FOR REFRACTORY IRON ORE

TECHNICAL FIELD

The present disclosure belongs to the technical field of mineral processing, and in particular relates to a multi-stage suspension magnetizing roasting-magnetic separation system device for refractory iron ore and relative method.

BACKGROUND ART

Due to the characteristic of fine grain size, complex mineral composition, low iron content and so on, the iron ore resources, such as fine hematite, oolitic hematite, endoscopy limonite and stacked iron tailings, are difficult to obtain ideal technical and economic indicators by conventional mineral processing technology, and difficult to obtain large-scale industrial development and utilization, or some resources may be developed but the utilization efficiency is very low.

Magnetizing roasting-magnetic separation technology is an effective way to deal with the above mentioned iron ore resources. The suspension magnetizing roasting has the advantages of sufficient gas-solid contact, good heat and mass transfer effect, and fast reaction speed. At present, it is widely used in the treatment of refractory iron ore. For example, the invention of "suspension magnetizing roasting furnace" with SIPO publication number of CN200720014578, and the invention of "iron mineral suspension magnetizing roasting system and roasting technology" with CN200710012802.

However, the abovementioned invention can only get a single roasting product, and the roasting product should be cooled down to the room temperature to get the products of different roasting qualities, and the single roasting product is prone to over-firing or under-burning during the roasting process.

SUMMARY OF THE INVENTION

The system device of the invention is shown in FIG. 1. wherein reference numerals represent the following components, 1—feed bin, 2—suspension preheater, 3—gas burner, 4—first-stage suspension oxidizer, 5—first-stage suspension reductor, 6—first-stage electromagnetic dry magnetic separator, 7—first-stage X-ray fluorescence online grade analyzer, 8—first-stage ore-like splitter, 9—second-stage suspension oxidizer, 10—second-stage suspension reductor, 11—first-stage tailings collector, 12—first-stage concentrate collector, 13—second-stage tailings collector, 14—second-stage concentrate collector, 15—second-stage middling ore collector, 16—cyclone separator, 17—dust remover, 18—dust collector, 19—roots blower, 20—second-stage electromagnetic dry magnetic separator, 21—second-stage X-ray fluorescence online grade analyzer, 22—second-stage ore-like splitter; wherein the feed inlet of the suspension preheater (2) is connected to the discharge outlet of the feed bin (1), and the discharge outlet of the suspension preheater (2) is connected to the feed inlet of the first-stage suspension oxidizer (4); the top discharge outlet of the first-stage suspension oxidizer (4) is connected to the feed inlet of the cyclone separator (16), the bottom discharge outlet of the first-stage suspension oxidizer (4) is connected to the inlet of the first-stage suspension reductor (5); the bottom discharge outlet of the reductor (5) is connected to the feed inlet of the first-stage electromagnetic dry magnetic separator (6), and the first-stage electromagnetic dry magnetic separator (6) is equipped with the first-stage X-ray fluorescence online grade analyzer (7) at the concentrate discharge outlet, the first-stage electromagnetic dry magnetic separator (6) is equipped with the first-stage X-ray fluorescence online grade analyzer (7) at the concentrate discharge outlet and is connected to the split inlet of the first-stage ore-like splitter (8), the high-grade discharge outlet of the first-stage ore-like splitter (8) is connected to the first-stage concentrate collector (12), the low-grade discharge outlet of the first-stage ore-like splitter (8) is connected to the feed inlet of the second-stage suspension oxidizer (9), the tailings outlet of the first-stage electromagnetic dry magnetic separator (6) is connected to the first-stage tailings collector (11); the bottom discharge outlet of the second-stage suspension oxidizer (9) is connected to the feed inlet of the second stage-suspension reducer (10); the bottom discharge outlet of the second-stage suspension reductor (10) is connected to the feed inlet of the second-stage electromagnetic dry magnetic separator (20), the concentrate outlet of the second-stage electromagnetic dry magnetic separator (20) is equipped with the second-stage X-ray fluorescence online analyzer (21) and is connected to the split inlet of the second-stage ore-like splitter (22), the high-grade concentrate split inlet of the second-stage ore-like splitter (22) is connected to the second-stage concentrate collector (14), the lower-grade concentrate split outlet of the second stage splitter (22) is connected to the second-stage middling ore collector (15), the tailings outlet of the second-stage electromagnetic dry magnetic separator (20) is connected to the second-stage tailings collector (13); the dust gas outlet at the top of the cyclone separator (16) is connected to the dust gas inlet of the dust remover (17); the air outlet at the top of the dust remover (17) is connected to the roots blower (19), and the dust outlet of the dust remover (17) is connected to the dust collector (18).

The above-mentioned suspension preheater (2) is of a barrel-type structure with a discharge outlet at the top, and a feed inlet at the lower sidewall, and a gas inlet at the bottom of the suspension preheater (2), the suspension preheater (2) is connected to the gas burner (3) through the gas inlet, and the gas burner (3) uses coal gas as a fuel.

Electric heating devices are arranged respectively at the outer walls of the above-mentioned first-stage suspension oxidizer (4), the first-stage suspension reductor (5), the second-stage suspension oxidizer (9) and the second-stage suspension reductor (10) so as to ensure that the temperatures in the aforementioned devices are set at the relevant temperatures; and thermocouple temperature measuring devices are arranged respectively in the furnaces of the oxidizers and the reductors respectively, and the temperature distribution can be monitored in real time by a computer.

The above-mentioned first-stage suspension reductor (5) and the second-stage suspension reductor (10) are provided with reducing gas spray inlet and protective gas spray inlet.

In addition, the state of material suspension in each reactor is controlled by the gas flow rate. According to the fluidization state parameters such as the density, viscosity, and particle size of the material, the required initial air volume in the suspended state can be determined. When the iron ore fines which fineness is −200 mesh accounts for more than 50% of the total mass and the amount of ore feeding is 100 Kg/h, the flow of suspended gas is required to be 1.5-7 $m^3$/h. The amount of gas required for per 100 kilograms ore feeding is 1-7 $m^3$, the specific gas volume needs to be determined according to the nature of the ore sample and production requirements.

A method for using the multi-stage suspension magnetizing roasting-magnetic separation system for refractory iron ore is performed according to the following steps:

1. the material ore fines of the complex refractory iron ore is placed in the feed bin (1), then fed into the suspension preheater (2) by the feed bin (1), meanwhile, the combustion flue gas is discharged form the gas burner (3) to the gas inlet of the suspension preheater (2), and control the temperature of the material at 600-1300° C. and keep the material in suspended state.

2. start the roots blower (19) to produce negative pressure, make the preheated material in the suspension preheater (2) into the first-stage suspension oxidizer (4), control the temperature of the material in the first-stage suspension oxidizer (4) at 800-1200° C. and stay for 10-60 min, control the air excess to ensure an oxidizing atmosphere; the oxidizing material enters the first-stage suspension reductor (5), the nitrogen $N_2$, hydrogen $H_2$, carbon monoxide gas CO are added into the first-stage suspension redactor (5) to control the reduction atmosphere, and the reducing gas is mixed gas of CO and $H_2$ with $N_2$, wherein the CO and $H_2$ accounts for 10-40%, of the total volume of reducing gas, and for 5-25 min, control the material temperature at 450-700° C., and the reduction reaction occurs at this temperature;

3. after the reaction in the first-stage suspension reductor (5) reaction, the material enters the first-stage electromagnetic dry magnetic separator (6) to carry out a first-stage electromagnetic separation, the magnetic field intensity of electromagnetic separation is 1000-5000 Oe; after the electromagnetic separation, the concentrate powder is detected by the first-stage X-ray fluorescence online grade analyzer (7), then enters the first-stage ore-like splitter (8), the concentrate with a grade higher than the preset value enters the first-stage concentrate collector (12) as a finished product, and the concentrate with a grade lower than the preset value enters the second-stage suspension oxidizer (9), and the tailings of the first stage electromagnetic dry magnetic separator (6) are discharged by the outlet into the first-stage tailings collector (11) to discharge.

4. the concentrate with a grade lower than the preset value enters the second-stage suspension oxidizer (9), control the temperature of the low-grade concentrate in the second-stage suspension oxidizer (9) at 700-1100° C. and stay time 10-30 min, control the oxidizing atmosphere in the second-stage suspension oxidizer (9) by excess air; the oxidizing low-grade concentrate material enters the second-stage suspension reductor (10), the nitrogen $N_2$, hydrogen $H_2$, carbon monoxide gas CO are added into the second-stage suspension redactor (10) to control the reduction atmosphere, the reducing gas is mixed gas of CO and $H_2$ with $N_2$, wherein the CO and $H_2$ accounts for 10-40% of the total volume of reducing gas, and stay for 5-15 min, control the material temperature at 450-700° C., and the reduction reaction occurs at this temperature;

5. after the reaction in the second-stage suspension reductor (10), the material enters the second-stage electromagnetic dry magnetic separator (20) to carried out a second-stage electromagnetic separation, the magnetic field intensity of the electromagnetic separation is 1000-5000 Oe; after the electromagnetic separation, the concentrate is detected by the second-stage X-ray fluorescence online grade analyzer (21), then enters the second-stage ore-like splitter (22), the concentrate with a grade higher than the preset value enters the second-stage concentrate collector (14), the concentrate with a grade lower than the preset value enters the second-stage middling ore collector (15) for subsequent third-stage oxidation-reduction roasting; the tailings of the second-stage electromagnetic dry magnetic separator (20) are discharged by the outlet into the second-stage tailings collector (13) to discharge.

6. the dust gas discharged from the second-stage suspension oxidizer (9) and the cyclone separator (16) enter the dust remover (17) through pipes for separation and purification, then the gas separated form the dust remover (17) is discharged into the atmosphere through the air outlet of the roots blower (19), and the solid ash separated from the dust remover (17) enters the dust collector (18) through the bottom of the dust remover (17).

In the above method, the amount of reducing gas added in the first-stage suspension reductor and the second-stage suspension redactor (10) is determined by the molar ratio of the CO and $H_2$ in the reducing gas to the $Fe_2O_3$ in the raw ore powder to be 1.1-1.2.

Compared with the suspension roasting device in the prior art, the present invention can achieve the piecewise magnetization roasting of refractory iron ore so as to make the materials with different reducing degrees separated in advance, effectively solve the phenomenon of under-burning and over-firing, improve the reduction effect and the separation index, and can greatly reduce the energy consumption and obtain better technical and economic indexes.

BRIEF DESCRIPTION OF THE DRAWINGS

FIG. 1 is a structural schematic drawing of the system for a multi-segment suspension magnetizing roasting and magnetic separation of refractory iron ore; wherein reference numerals represent the following components, 1—feed bin, 2—suspension preheater, 3—gas burner, 4—first-stage suspension oxidizer, 5—first-stage suspension reductor, 6—first-stage electromagnetic dry magnetic separator, 7—first-stage X-ray fluorescence online grade analyzer, 8—first-stage ore-like splitter, 9—second-stage suspension oxidizer, 10—second-stage suspension reductor, 11—first-stage tailings collector, 12—first-stage concentrate collector, 13—second-stage tailings collector, 14—second-stage concentrate collector, 15—second-stage middling ore collector, 16—cyclone separator, 17—dust remover, 18—dust collector, 19—roots blower, 20—second-stage electromagnetic dry magnetic separator, 21—second-stage X-ray fluorescence online grade analyzer, 22—second-stage ore-like splitter.

DETAILED DESCRIPTIONS OF THE PREFERRED EMBODIMENTS

The system of multi-stage magnetizing roasting-magnetic separation for refractory iron ore is constructed in accordance with the structure and process described in the previous contents of the present invention, and two different raw ore powders are performed as follows:

Embodiment 1

The complex refractory ore used in embodiment 1 is raw ore fines, which particle size of −74 μm accounts for more than 80% of the total weight of all fines. Analysis of the raw ore and the chemical phase are shown in table 1 and table 2.

TABLE 1

Analysis of raw ore composition (%)

| | Composition | | | | | |
|---|---|---|---|---|---|---|
| | TFe | SiO$_2$ | Al$_2$O$_3$ | CaO | MgO | S | P |
| Content | 31.60 | 22.97 | 3.12 | 2.07 | 2.68 | 0.07 | 0.41 |

TABLE 2

Chemical phase of raw ore (%)

| | Iron Phases | | | | | |
|---|---|---|---|---|---|---|
| | Hematite/Limonite | Magnetite | Iron Carbonate | Iron Sulfide | Silicate Iron | Total Fe |
| Content | 21.54 | 0.29 | 8.28 | 0.87 | 0.58 | 31.56 |
| Distribution rate | 68.25 | 0.92 | 26.24 | 2.76 | 1.84 | 100.00 |

Operate According to the Following Method:

1. the material ore fines of complex refractory ore is placed in the feed bin (1), then is added into the suspension preheater (2) by the feed bin (1), meanwhile, the high temperature combustion flue gas provided by the gas burner (3) enters the gas inlet of the suspension preheater (2), control the temperature of the raw ore fines at 800° C. and keep the fines in suspension state;

2. start the roots blower (19) to produce negative pressure to make the preheated raw ore fines in the suspended preheater (2) into the first-stage suspension oxidizer (4), control the temperature of the raw ore fines in the first-stage suspension oxidizer (4) at 860° C. and stay for 15 min, control the air excess to ensure an oxidizing atmosphere; the oxidizing raw ore fines enters the first-stage suspension reductor (5) which is filled with nitrogen N$_2$ and carbon monoxide CO, wherein the CO accounts for 25% of the total volume of the mixture of N$_2$ and carbon monoxide, and stay for 10 min, control the temperature of raw ore fines at 500° C., and the reduction reaction occurs at this temperature;

3. after the reaction in the first-stage suspension reductor (5), the raw ore fines enters the first-stage electromagnetic dry magnetic separator (6) to perform a first-stage electromagnetic separation, the magnetic field intensity of electromagnetic separation is 1800 Oe; the concentrate powder obtained after electromagnetic separation is detected by the first-stage X-ray fluorescence online grade analyzer (7), then enters the first-stage ore-like splitter (8); the concentrate with a grade higher than the preset value of 56% enters the first-stage concentrate collector (12) as a finished product, and the concentrate with a grade under the preset value of 56% enters the second-stage suspension oxidizer (9), and the tailings of the first-stage electromagnetic dry magnetic separator (6) are discharged by the outlet into the first-stage tailings collector (11) to discharge;

4. the low-grade concentrate powder enters the second-stage suspension oxidizer (9), control the temperature of the low-grade concentrate in the second-stage suspension oxidizer (9) at 700° C. and stay for 10 minutes, the oxidizing atmosphere in the second-stage suspension oxidizer (9) is controlled by excess air; the oxidizing low-grade concentrate powder enters the second-stage suspension reductor (10) which is filled with nitrogen N$_2$ and carbon monoxide CO to control the reduction atmosphere, wherein the volume percentage of CO is 30%, stay for 5 minutes, and control the reduction temperature at 450° C.;

5. after the reaction in the second-stage suspension reductor (10), the material enters the second-stage electromagnetic dry magnetic separator (20) to perform a second-stage electromagnetic separation, the magnetic field intensity of the electromagnetic separation is 3000 Oe; the concentrate powder obtained after the second-stage electromagnetic separation is detected by the second-stage X-ray fluorescence online grade analyzer (21), then enters the second-stage ore-like splitter (22); the concentrate with a grade higher than the preset value 50% enters the second-stage concentrate collector (14), the concentrate with a grade under 50% enters the second-stage middling ore collector (15) for subsequent third-stage oxidation-reduction roasting, the tailings of the second-stage electromagnetic dry magnetic separator (20) are discharged by the outlet into the second-stage tailings collector (13) to discharge;

6. the dust gas discharged from the second-stage suspension oxidizer (9) and the cyclone separator (16) enter the dust remover (17) through pipelines for separation and purification, then the gas separated from the dust remover (17) is discharged into the atmosphere through the exhaust port of the roots blower (19), and the solid dust separated from the dust remover (17) enters the dust collector (18) from the bottom outlet of the dust remover (17);

The amount of reducing gas added into the first-stage and second-stage suspension reductors is determined by the molar ratio of the CO in the reducing gas to Fe$_2$O$_3$ in the raw ore fines to be 1:1.

The composition analysis of the obtained first-stage concentrate and second-stage concentrate are shown in Table 3 and Table 4.

TABLE 3

Composition analysis of the first-stage concentrate (%)

| | Composition | | | | | |
|---|---|---|---|---|---|---|
| | TFe | SiO$_2$ | Al$_2$O$_3$ | CaO | MgO | S | P |
| Content | 60.71 | 5.66 | 0.76 | 0.84 | 3.11 | 0.04 | 0.24 |

TABLE 4

Composition analysis of the second-stage concentrate (%)

| | Composition | | | | | |
|---|---|---|---|---|---|---|
| | TFe | SiO$_2$ | Al$_2$O$_3$ | CaO | MgO | S | P |
| Content | 52.71 | 9.35 | 1.36 | 1.24 | 2.98 | 0.05 | 0.35 |

Embodiment 2

The complex refractory ore used in embodiment 2 is raw ore fines, which particle size of −38 μm accounts for more than 90% of the total weight of all fines. The analysis of the raw ore and the chemical phase are shown in table 5 and table 6.

TABLE 5

Composition analysis of raw ore (%)

| | Composition | | | | | |
|---|---|---|---|---|---|---|
| | TFe | $SiO_2$ | $Al_2O_3$ | CaO | MgO | S | P |
| Content | 26.87 | 19.62 | 2.79 | 3.89 | 2.85 | 0.04 | 0.11 |

TABLE 6

Chemical phase of raw ore (%)

| | Iron Phases | | | | | |
|---|---|---|---|---|---|---|
| | Hematite/Limonite | Magnetite | Iron Carbonate | Iron Sulfide | Silicate Iron | Total Fe |
| Content | 24.52 | 7.78 | 7.11 | 0.15 | 0.12 | 39.68 |
| Distribution rate | 61.79 | 19.61 | 17.92 | 0.38 | 0.30 | 100.00 |

Operate According to the Following Method:

1. the material raw ore fines of complex and refractory ore is placed in the feed bin (1), then is added to the suspension preheater (2) by the feed bin (1), meanwhile, the high temperature combustion flue gas provided by the gas burner (3) enters the gas inlet of the suspension preheater (2), control the temperature of the raw ore fines at 850° C. and keep the powder in suspension state;

2. start the roots blower (19) to produce negative pressure to make the preheated raw ore fines in the suspended preheater (2) into the first-stage suspension oxidizer (4), control the temperature of raw ore fines in the first-stage suspension oxidizer (4) at 860° C. and stay for 15 minutes, control the air excess to ensure an oxidizing atmosphere; the oxidizing raw ore fines enters the first-stage suspension reductor (5) which is filled with nitrogen $N_2$ and carbon monoxide CO, wherein the CO accounts for 25% of the total volume of the mixture of $N_2$ and carbon monoxide, and stay for 10 minutes, control the temperature of raw ore fines at 530° C., and reduction reaction occurs at this temperature;

3. after the reaction in the first-stage suspension reductor (5), the raw ore fines enters the first-stage electromagnetic dry magnetic separator (6) to perform a first-stage electromagnetic separation, the magnetic field intensity of electromagnetic separation is 2000 Oe; the concentrate powder obtained after electromagnetic separation is detected by the first-stage X-ray fluorescence online grade analyzer (7), then enters the first-stage ore-like splitter (8); the concentrate with a grade higher than 60% enters the first-stage concentrate collector (12) as a finished product, the concentrate with a grade under the preset value of 60% enters the second-stage suspension oxidizer (9), and the tailings of the first-stage electromagnetic dry magnetic separator (6) are discharged by the outlet into the first-stage tailings collector (11) to discharge;

4. the low-grade concentrate powder enters the second-stage suspension oxidizer (9), control the temperature of the low-grade concentrate in the second-stage suspension oxidizer (9) at 750° C. and stay for 10 minutes, the oxidizing atmosphere in the second-stage suspension oxidizer (9) is controlled by excess air; the oxidizing low-grade concentrate powder enters the second-stage suspension reductor (10) which is filled with nitrogen $N_2$ and carbon monoxide CO to control the reduction atmosphere, Wherein the volume percentage of CO is 25%, stay for 5 minutes, and control the reduction temperature at 450° C.;

5. after the reaction in the second-stage suspension reductor (10), the material enters the second-stage electromagnetic dry magnetic separator (20) to perform a second-stage electromagnetic separation, the magnetic field intensity of the electromagnetic separation is 3000 Oe; the concentrate powder obtained after the second-stage electromagnetic separation is detected by the second-stage X-ray fluorescence online grade analyzer (21), then enters the second-stage ore-like splitter (22); the concentrate with a grade higher than 50% enters the second-stage concentrate collector (14), the concentrate with a grade under the preset value of 50% enters the second-stage middling ore collector (15) for subsequent third-stage oxidation-reduction roasting, the tailing of the second-stage electromagnetic dry magnetic separator (20) are discharged by the outlet into the second-stage tailings collector (13) to discharge;

6. the dust gas discharged from the second-stage suspension oxidizer (9) and the cyclone separator (16) enters into the dust remover (17) through pipelines for separation and purification, then the gas separated from the dust remover (17) is discharged into the atmosphere through the exhaust port of the roots blower (19), and the solid dust separated from the dust remover (17) enters the dust collector (18) from the bottom outlet of the dust remover (17);

The amount of reducing gas added into the first-stage and second-stage suspension reductors is determined by the molar ratio of the CO in the reducing gas to $Fe_2O_3$ in the raw ore fines to be 1:1.

The composition analysis of the first-stage concentrate and second-stage concentrate are shown in Table 7 and Table 8.

TABLE 7

Composition analysis of the first-stage concentrate (%)

| | Composition | | | | | |
|---|---|---|---|---|---|---|
| | TFe | $SiO_2$ | $Al_2O_3$ | CaO | MgO | S | P |
| Content | 63.05 | 4.89 | 0.89 | 1.21 | 2.79 | 0.01 | 0.07 |

TABLE 8

Composition analysis of the second-stage concentrate (%)

| | Composition | | | | | |
|---|---|---|---|---|---|---|
| | TFe | $SiO_2$ | $Al_2O_3$ | CaO | MgO | S | P |
| Content | 55.25 | 8.76 | 1.07 | 1.53 | 2.92 | 0.01 | 0.09 |

The invention claimed is:

1. A multi-stage suspension magnetizing roasting-magnetic separation system for processing a refractory iron ore, comprising: a feed bin, a suspension preheater, a gas burner, a first-stage suspension oxidizer, a first-stage suspension reductor, a first-stage electromagnetic dry magnetic separator, a first-stage X-ray fluorescence online grade analyzer, a first-stage splitter, a second-stage suspension oxidizer, a second-stage suspension reductor, a first-stage tailings collector, a first-stage concentrate collector, a second-stage tailings collector, a second-stage concentrate collector, a second-stage middling ore collector, a cyclone separator, a dust remover, a dust collector, a roots blower, a second-stage electromagnetic dry magnetic separator, a second-stage X-ray fluorescence online grade analyzer, and a second-stage splitter, wherein a feed inlet of the suspension preheater is connected to a discharge outlet of the feed bin, and a discharge outlet of the suspension preheater is connected to a feed inlet of the first-stage suspension oxidizer, wherein a top discharge outlet of the first-stage suspension oxidizer is connected to a feed inlet of the cyclone separator, a bottom discharge outlet of the first-stage suspension oxidizer is connected to an inlet of the first-stage suspension reductor, a bottom discharge outlet of the first-stage reductor is connected to a feed inlet of the first-stage electromagnetic dry magnetic separator, and the first-stage X-ray fluorescence online grade analyzer is disposed between an outlet of the first-stage electromagnetic dry magnetic separator, and an inlet of the first-stage splitter, wherein the first-stage splitter has a high-grade discharge outlet connected to the first-stage concentrate collector and a low-grade discharge outlet connected to an inlet of the second-stage suspension oxidizer, and a tailings outlet of the first-stage electromagnetic dry magnetic separator is connected to the first-stage tailings collector, wherein an outlet of the second-stage suspension oxidizer is connected to a feed inlet of the second stage-suspension reductor, and a bottom discharge outlet of the second-stage suspension reductor is connected to a feed inlet of the second-stage electromagnetic dry magnetic separator, wherein the second-stage X-ray fluorescence online grade analyzer is disposed between a concentrate outlet of the second-stage electromagnetic dry magnetic separator and an inlet of the second-stage splitter, wherein the second stage splitter has a high-grade concentrate outlet connected to the second-stage concentrate collector and a low-grade concentrate outlet connected to the second-stage middling ore collector, and a tailings outlet of the second-stage electromagnetic dry magnetic separator is connected to the second-stage tailings collector, and wherein a dust gas outlet at a top of the cyclone separator is connected to a dust gas inlet of the dust remover, an air outlet at a top of the dust remover is connected to the roots blower, and a dust outlet of the dust remover is connected to the dust collector.

2. The multi-stage suspension magnetizing roasting-magnetic separation system according to claim 1, wherein the discharge outlet of the suspension preheater is disposed at a top of the suspension preheater, wherein the suspension preheater further comprises a feed inlet disposed at a sidewall, and a gas inlet at a bottom of the suspension preheater, and wherein the gas inlet of the suspension preheater is connected to the gas burner.

3. The multi-stage suspension magnetizing roasting-magnetic separation system according to claim 1, wherein the first-stage suspension oxidizer, the first-stage suspension reductor, the second-stage suspension oxidizer, and the second-stage suspension reductor each has a plurality of electric heating devices affixed to an external surface thereof.

4. The multi-stage suspension magnetizing roasting-magnetic separation system according to claim 1, wherein the first-stage suspension reductor and the second-stage suspension reductor each has a reducing gas spray inlet and a protective gas spray inlet.

5. A method for processing a refractory iron ore in the system of claim 1, comprising:
(1) feeding a material that is a powder of the refractory iron ore through the feed bin into the suspension preheater, feeding a combustion flue gas from the gas burner to a gas inlet of the suspension preheater, controlling a temperature of the material in the suspension preheater at 600-1300° C. in a suspension state;
(2) starting the roots blower to create a negative pressure to move a preheated material in the suspension preheater into the first-stage suspension oxidizer, controlling a temperature of a material at 800-1200° C. and for a residence time of 10-60 min in the first-stage suspension oxidizer while maintaining an oxidizing atmosphere in the first-stage suspension oxidizer;
feeding an oxidized material to the first-stage suspension reductor, feeding a reducing gas into the first-stage suspension reductor, controlling a temperature of a material at 450-700° C. and for a residence time of 5-25 min in the first-stage suspension reductor, wherein the reducing gas comprises nitrogen and 10-40 vol % of carbon monoxide and hydrogen;
(3) separating a reduced material from the first stage suspension reductor in the first-stage electromagnetic dry magnetic separator at a magnetic field intensity of 1000-5000 Oe to obtain a first concentrate and a first tailings, determining a grade of the first concentrate using the first-stage X-ray fluorescence online grade analyzer, when the first concentrate has a grade higher than a preset value, feeding the first concentrate to the first-stage concentrate collector as a finished product, and when the first concentrate has a grade lower than the preset value, feeding the first concentrate as a low-grade concentrate to the second-stage suspension oxidizer, and discharging the first tailings of the first-stage electromagnetic dry magnetic separator into the first-stage tailings collector;
(4) controlling a temperature of the low-grade concentrate at 700-1100° C. and for a residence time of 10-30 min in the second-stage suspension oxidizer to produce an oxidized low-grade concentrate; feeding the reducing gas into the second-stage suspension redactor; reducing the oxidized low-grade concentrate in the second-stage suspension reductor at a temperature of 450-700° C. for 5-15 min in the reducing gas;
(5) feeding a reduced low-grade concentrate into the second-stage electromagnetic dry magnetic separator to carry out a second-stage electromagnetic separation at a magnetic field intensity of 1000-5000 Oe to obtain a second concentrate and a second tailings; determining a grade of the second concentrate using the second-stage X-ray fluorescence online grade analyzer, when the second concentrate has a grade higher than the preset value, feeding the second concentrate into the second-stage concentrate collector, when the second concentrate has a grade lower than the preset value, feeding the second concentrate into the second-stage middling ore collector; discharging the second tailings into the second-stage tailings collector; and
(6) feeding a dust gas discharged from the second-stage suspension oxidizer and the cyclone separator into the dust remover; discharging a gas separated from the dust remover is into the atmosphere through an air outlet of the roots blower, and discharging a solid ash from the dust remover into the dust collector through a bottom outlet of the dust remover.

6. The method according to claim 5, wherein a total amount of the reducing gas fed into the first-stage suspension reductor and the second-stage suspension reductor satisfies a molar ratio of CO and $H_2$ in the reducing gas to $Fe_2O_3$ in the refractory iron ore powder of 1:1-1.2.

7. The method according to claim 5, wherein an amount of the reducing gas fed into the second-stage suspension reductor satisfies a molar ratio of CO and $H_2$ in the reducing gas to $Fe_2O_3$ in the refractory iron ore powder of 1:1-1.2.

\* \* \* \* \*